(12) United States Patent
Shiraishi et al.

(10) Patent No.: US 7,182,720 B2
(45) Date of Patent: Feb. 27, 2007

(54) MACHINE TOOL

(75) Inventors: Yoshihiro Shiraishi, Toyama (JP); Tsutomu Sugihara, Toyama (JP); Mitsuru Nukui, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 528 days.

(21) Appl. No.: 10/760,375

(22) Filed: Jan. 21, 2004

(65) Prior Publication Data

US 2006/0133903 A1 Jun. 22, 2006

(30) Foreign Application Priority Data

Jan. 22, 2003 (JP) .................... P. 2003-014021

(51) Int. Cl.
  *B23C 1/02* (2006.01)
  *B23Q 11/08* (2006.01)
  *B23Q 3/157* (2006.01)
(52) U.S. Cl. .................. 483/3; 409/134; 451/451; 451/454; 29/DIG. 59; 408/241 G
(58) Field of Classification Search .................. 483/3; 409/134, 235, 135–136; 408/241 G; 74/608–609, 74/612; 29/DIG. 59; 451/451, 454, 455
See application file for complete search history.

(56) References Cited

U.S. PATENT DOCUMENTS 3,466,811 A * 9/1969 Suddarth .................. 451/451
5,482,414 A * 1/1996 Hayashi et al. ............. 409/134
5,607,269 A * 3/1997 Dowd et al. ................ 409/134
6,116,830 A * 9/2000 Azema ....................... 409/134
6,120,222 A * 9/2000 Hiramoto et al. ........... 409/134
6,260,439 B1* 7/2001 Tabellini et al. .............. 74/612
6,481,313 B1* 11/2002 Tabellini ...................... 74/612
6,811,361 B2* 11/2004 Sugata et al. ............... 409/134
6,884,009 B2* 4/2005 Maeda ........................ 409/134
7,063,653 B2* 6/2006 Horibe et al. .................. 483/3
2005/0180827 A1* 8/2005 Lutz ........................... 409/134
2006/0120819 A1* 6/2006 Honegger et al. .......... 409/235

FOREIGN PATENT DOCUMENTS

JP 2001-315040 A * 11/2001
JP 2004-283953 A * 10/2004

* cited by examiner

*Primary Examiner*—Erica Cadugan
(74) *Attorney, Agent, or Firm*—Sughrue Mion, PLLC (57) ABSTRACT

A machine tool has a support table provided on an upper surface of a bed to support a work, a Z-axis saddle, a machining unit mounted on the Z-axis saddle and provided with a machining head, a compartment cover arranged on the bed to compartment a region and a machine region, an opening window provided on the compartment cover to permit the machining head to go in and out therethrough, and a seal member in the form of a closed ring to be mounted on an inner peripheral edge of the opening window of the compartment cover, wherein an entire periphery of an outer peripheral surface of the machining head is brought into sliding contact with an inner peripheral edge of the seal member in a state, in which the machining head is moved into the machining region from a tool exchange position within the machine region.

15 Claims, 7 Drawing Sheets

MACHINE TOOL

BACKGROUND OF THE INVENTION

1. Field of the Invention

The present invention relates to a machine tool for advancing and retreating a machining unit from a work supported on a work support table to perform machining of a work, and more particular, to a cover construction.

2. Description of the Related Art

Generally, a machine tool comprises a work support table for supporting a work being machined, and a machining unit capable of mounting and dismounting of tools, which perform machining, such as drilling or the like, of the work. The machining unit is composed of a Z-axis saddle mounted on a bet to be able to reciprocate in a Z-axis direction (longitudinally), a column mounted on the Z-axis saddle, and a machining head mounted on the column to grasp tools. And the machining unit is advanced to perform machining of a work, and when machining is terminated, the machining unit is retreated. Also, the column is mounted on the Z-axis saddle to be able to reciprocate in a X-axis direction (laterally). Further, there are some configurations, in which a X-axis saddle for reciprocation relative to the column in a Y-axis direction (vertically) is mounted, the machining head is mounted on the Y-axis saddle, and the machining unit is moved in three axial directions, that is, X-axis direction, Y-axis direction, and Z-axis direction.

Figure 3:
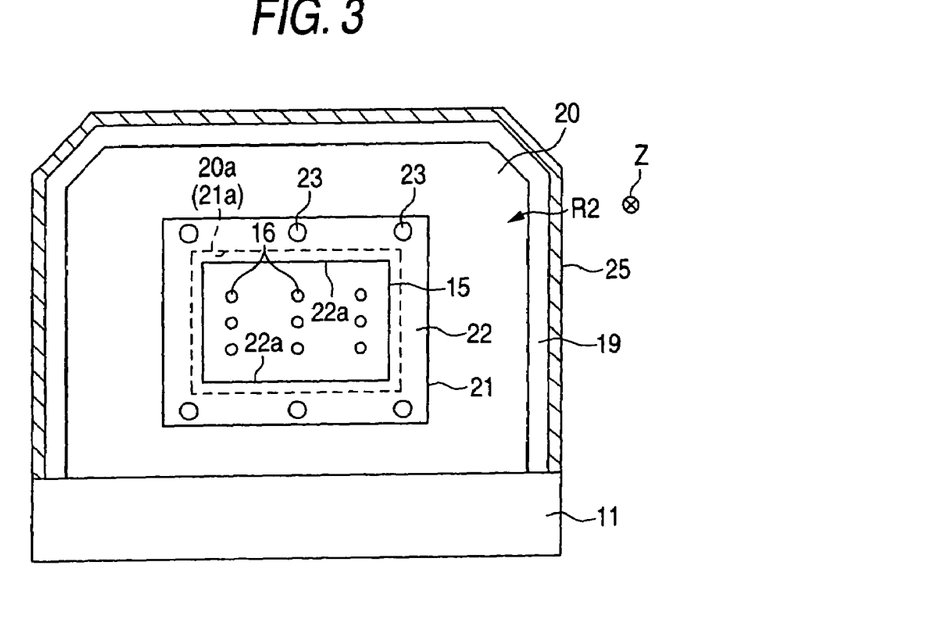
FIG. 3 is a transverse, cross sectional view showing the machine tool of FIG. 1.

While the machining head performs machining of a work, coolant containing a cutting oil for cooling and lubrication of tools and a work is supplied. When such coolant and chip enter into a machine region on a side of the machining unit from the machining head, a harmful influence is exerted on various sensors and limit switches provided on the machining unit, or slide members, seal members, or the like on X-axis, Y-axis, and Z-axis drive mechanisms. Therefore, a cover device is provided between the machining unit and a work support table. There has been heretofore proposed as such cover device an arrangement, in which an opening window for taking the machining head in and out in a X-axis direction (longitudinally) is provided on a stationary-side cover for compartment and formation of a machining room of a work, and a movable cover for shielding to prevent scattering of coolant outside from the opening window during machining of a work is provided on an outer peripheral surface of the machining head to be close to an opening window of a compartment cover. A configuration (JP-UM-A-4-115554) similar to the conventional configuration is shown in FIG. 3.

Also, a conventional cover device for machine tools is disclosed and proposed in JP-A-6-210531. The cover device is constructed such that a cylindrical-shaped opening of a protective cover surrounding a periphery of a machining head is fitted onto an opening window of a compartment cover in a manner to be able to advance and retreat.

Since the conventional cover device, disclosed in JP-UM-A-4-115554, for machine tools is not constructed such that a movable cover is brought into close contact with the opening window of the compartment cover during machining of a work, however, there are caused problems that sealing is made incomplete, and a part of coolant enters into a machine region on a side of the machining unit because the movable cover is opened downward. Further, the cover device cannot cope with the case where a machining unit is of a type, in which tools are driven left and right, and up and down. In recent years, coolant as developed has an adverse influence on equipments such as sensors, limit switches, and so on, and seal members, and so a solution therefor has been demanded.

Meanwhile, the cover device, disclosed in JP-A-6-210531, for machine tools is not constructed such that the cylindrical-shaped opening of the protective cover is brought into close contact with the opening window of the compartment cover during machining of a work. Therefore, the machining unit is retreated into a machine region in a state, in which coolant and chip adhere to an outer peripheral surface of the cylindrical-shaped opening, so that the machine region is made dirty. Besides, since an inside of the cylindrical-shaped opening is put in an opened state, coolant, chip, and scraps accumulate therein to be taken into the machine region during retreating of the machining unit while coolant and chip remain adhered to a peripheral surface of the machining head.

SUMMARY OF THE INVENTION

It is a first object of the invention to dissolve problems involved in the prior art-and to provide a machine tool of a type, in which a machining unit is advanced at the time of machining of a work, and which can prevent coolant and chip from entering a side of the machining unit during machining of a work and can surely prevent coolant and chip from being taken into a machine region due to retreating of the machining unit.

In addition to the first object, it is a second object of the invention to provide a machine tool, in which a machining unit can be moved in a transverse direction or in a vertical direction and which comprises a cover construction capable of preventing coolant and chip from entering a side of the machining unit during machining.

In order to solve the above problems, according to a first aspect resides in a machine tool comprising a support table provided on an upper surface of a bed to support a work, a Z-axis saddle for reciprocation toward in a Z-axis direction (longitudinally), and a machining unit mounted on the Z-axis saddle and provided with a machining head for machining of the work, and wherein a compartment cover is arranged on the bed to compartment a region, in which a work supported on the support table is machined, and a machine region, in which the machining unit is movably arranged, an opening window is provided on the compartment cover to permit the machining head to go in and out therethrough, a seal member in the form of a closed ring to be mounted on an inner peripheral edge of the opening window of the compartment cover, and an entire periphery of an outer peripheral surface of the machining head is brought into sliding contact with an inner peripheral edge of the seal member in a state, in which the machining head is moved into the machining region from a tool exchange position within the machine region.

According to a second aspect resides in that constitution as set forth in the first aspect, in which the machining unit is configured to permit exchange of plural kinds of machining heads having different body sizes, an opening is formed in the compartment cover to enable a machining head of a maximum size to go in and out, and the opening selectively and exchangeably mounts thereto plural kinds of seal frames comprising a mount frame formed with the opening window conformed to a body size of each of the machining heads, and the seal member mounted to an inner peripheral edge of the opening window of the mount frame and put into contact with an outer peripheral surface of a body of the machining head.

According to a third aspect resides in that constitution as set forth in the first aspect, in which the machining unit is configured to permit exchange of plural kinds of machining heads having different body sizes, the seal member conformed to a maximum body size of the machining heads is mounted to the opening window of the mount frame, plural kinds of head covers formed into complementary shapes so as to assume the same shape as the external shape of a body of the machining head having the maximum body size upon mounting on those machining heads having sizes, which are equal to or less in size than the maximum body size, are selectively and exchangeably mounted on the machining unit, and a seal member is mounted on an inner edge of the head cover to come into contact with the outer peripheral surface of the machining head.

According to a fourth aspect resides in that constitution as set forth in the first aspect, in which the machining head is mounted to be able to reciprocate in a X-axis direction (laterally) or a Y-axis direction (vertically), a shield cover is mounted on the machining unit to shield the machining head and to allow reciprocatory movements of the machining head in the X-axis direction (laterally) or the Y-axis direction (vertically), and an outer peripheral surface of an annular frame constituting the shield cover is brought into sliding contact with an inner peripheral surface of the seal member on a side of the opening window in a state, in which the machining head is moved into the machining region from a tool exchange position within the machine region.

According to a fifth aspect resides in that constitution as set forth in the first aspect, in which the compartment cover comprises an arch-shaped support frame provided upright in a predetermined position on the bed, and an extensible cover mounted inside the support frame to be able to reciprocate together with the seal member in a X-axis direction (laterally) or a Y-axis direction (vertically), and wherein interlocking unit is provided between the machining unit and the extensible cover to move the extensible cover and the seal member in the X-axis direction or the Y-axis direction so that the machining head corresponds to the seal member as viewed in a Z-axis direction when the machining unit is moved in the X-axis direction or the Y-axis direction.

According to a sixth aspect resides in that constitution as set forth in the fourth or sixth aspect, in which the compartment cover comprises a roll cover or a telescopic cover.

According to a seventh aspect resides in that constitution according to any one of the first to sixth aspect, in which guide rails are mounted immediately on the upper surface of the bed and the Z-axis saddle of the machining unit is mounted on the guide rails.

According to a eighth aspect resides in that constitution according to any one of the first to seventh aspect, in which the seal member comprises a scraper having a seal lip and has its tip end directed toward the machining region.

According to a ninth aspect resides in that constitution according to any one of the first to eighth aspect, in which the machining head comprises a multi spindle head provided with a plurality of tools.

[Advantage of the Invention]

In the invention as set forth in the first aspect, it is possible in a machine tool of a type, in which a machining unit is advanced in a Z-axis direction at the time of machining of a work, to prevent coolant and chip from entering into a machining region during machining of a work. Also, it is possible to surely prevent coolant and chip from being taken into a machine region due to retreating of the machining unit.

In the invention as set forth in the second aspect, when a machining head is to be exchanged by one having a different body size, such exchange can be met by exchange of a seal frame.

In the invention as set forth in the third aspect, when a machining head is to be exchanged by one having a different body size, such exchange can be met by exchange of a head cover.

In the invention as set forth in the fourth or fifth aspect, it is possible in a machine tool, in which a machining head can be moved in a X-axis direction (laterally) or a Y-axis direction (vertically), to prevent coolant and chip from entering into a side of a machining unit during machining of a work.

In the invention as set forth in the sixth aspect, it is possible to simply construct an extensible cover of high air tightness.

In the invention as set forth in the seventh aspect, the construction of assembling a machining unit to a bed is made simple to enhance an assembling accuracy and to enhance accuracy, with which tools machine a work.

In the invention as set forth in the eighth aspect, a lip seal is used to surely remove coolant or chip adhering to an outer peripheral surface of a body of the head when the machining head is retreated.

In the invention as set forth in the ninth aspect, a single machining head can perform plural machining operations at a time, and a seal member can close an entire outer periphery of a head body to surely shield coolant and chip scattered in a machining region.

DETAILED DESCRIPTION OF THE PREFERRED EMBODIMENTS

First Embodiment

A first embodiment, in which a cover device for machine tools, according to the invention is embodied, is described below with reference to FIGS. 1 to 3.

Figure 1:
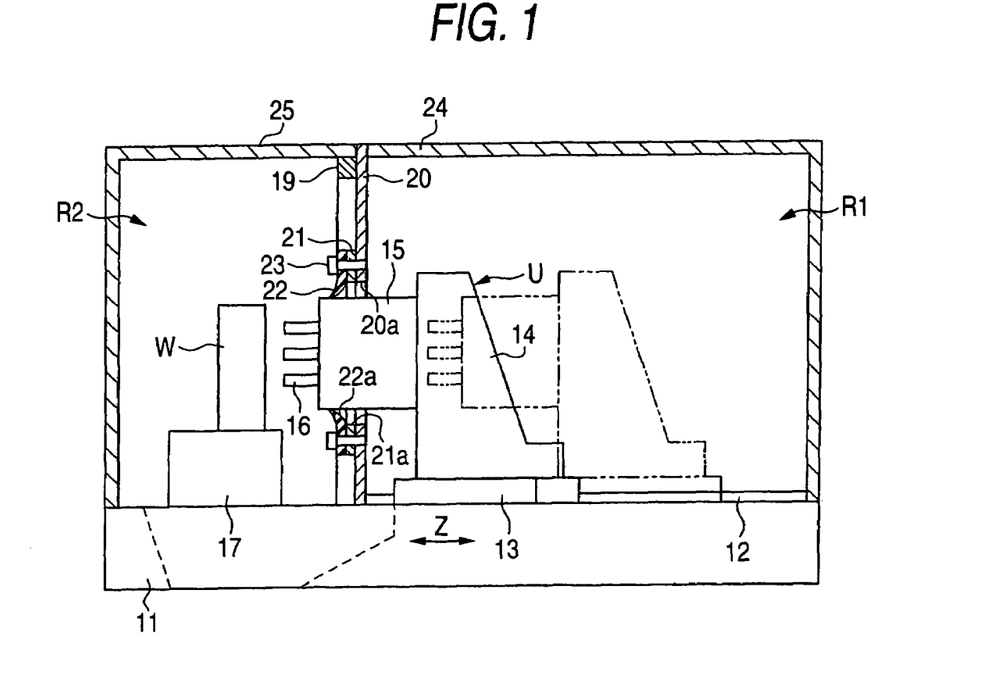
FIG. 1 is a longitudinal, cross sectional view showing a first embodiment of a machine tool according to the invention.

As shown in FIG. 1, Z-axis guide rails 12 are laid immediately on an upper surface of a bed 11 in a Z-axis direction (front and back), and a Z-axis saddle 13 reciprocated in the Z-axis direction by a Z-axis drive mechanism including a servomotor (not shown) is mounted on the Z-axis guide rails 12. A column 14 is mounted on an upper surface of the Z-axis saddle 13 to be moved in the Z-axis direction. A machining head 15 is mounted on a front surface (left side in FIG. 1) of the column 14 to be directed in the Z-axis direction, and a plurality of drills 16 as tools are mounted on the machining head 15 to constitute a multi spindle head. And the drills 16 are rotatingly driven by a rotary mechanism (not shown) provided in the machining head 15.

In this embodiment, a machining unit U is composed of the Z-axis saddle 13, the column 14, the machining head 15, and the drills 16.

A work support table 17 is provided on the upper surface of the bed 11 by means of a support shaft, and a work W is held in a predetermined position on an upper surface of the work support table 17 by a clamp mechanism (not shown).

Also, formed below the work support table 17 is a chip discharge passage, into which chip and coolant are recovered through a chip drop hole.

An arch-shaped (see FIG. 3) support frame 19 is provided upright on the upper surface of the bed 11 to be positioned between the machining unit U and the work support table 17. A compartment cover 20 in the form of a flat plate is mounted on a right side of the support frame 19 by means of bolts or welding. An opening window 20a, through which the machining head 15 can go in and out, is formed centrally of the compartment cover 20. As shown in FIG. 3, the machining head 15 has an external shape of a rectangle being long sideways, as viewed from the Z-axis direction (perpendicular to a plane of the drawing), and the opening window 20a also has an external body shape of a rectangle being long sideways. Mounted on a left side of the compartment cover 20 is a mount frame 21 in the form of a rectangular frame being long sideways, the mount frame being formed with an opening window 21a conformed to the opening window 20a. Joined to a left side of the mount frame 21 by means of an adhesive is a scraper 22 serving as a seal member formed from, for example, synthetic rubber and fluoro rubber, which are favorably corrosion-resistant against coolant.

In this embodiment, a seal frame is constituted by the mount frame 21 and the scraper 22, and detachably mounted to the compartment cover 20 by means of a plurality of bolts 23 while being integral.

The scraper 22 is formed to assume a shape of a rectangular frame being long sideways as shown in FIG. 3, and a whole shape of a seal lip 22a disposed inside of the scraper, as viewed from the Z-axis direction, is rectangular to be similar to the external body shape of the machining head 15. Respective internal dimensions of length and width of the seal lip 22a are formed to be somewhat smaller than respective external dimensions of length and width of the machining head 15 in a state, in which the seal lip is not in contact with the machining head 15. Tip ends of the seal lip 22a are directed toward a machining region to be able to prevent entry of the coolant into a machine region. An adequate sealing effect is produced even in the case where mist coolant is used.

Making use of the support frame 19, a protective cover 24 is provided in a manner to shield the machining unit U. Also, making use of the support frame 19, a protective cover 25 is provided in a manner to shield the work support table 17 and the work W. The protective cover 24 compartments and forms a machine room R1 as a machine region rightwardly of the compartment cover 20 and the protective cover 25 compartments and forms a machining room R2 leftwardly of the compartment cover 20.

Subsequently, an operation of the machine tool constituted in the above manner is described.

Figure 6:
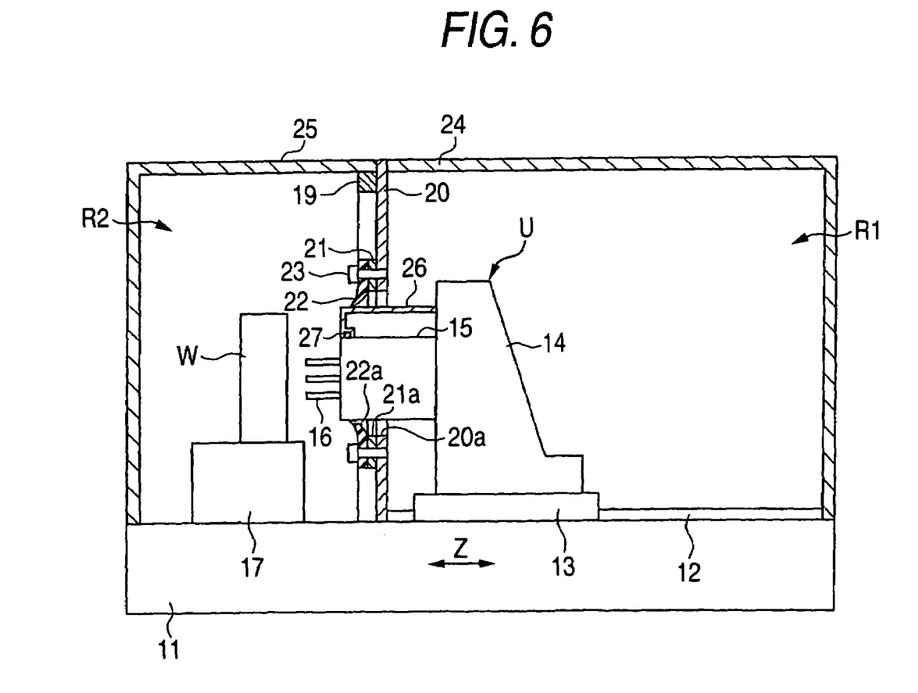
FIG. 6 is a longitudinal, cross sectional view showing a machine tool modified in the first embodiment.

Solid lines in FIG. 6 show a state, in which the machining unit U is moved leftward along the Z-axis guide rails 12, the machining head 15 is disposed in a withdrawal position within the machining room R2, and an outer peripheral edge of a body tip end of the machining head 15 comes into contact with tip end of the seal lip 22a of the scraper 22. In this state, an inner peripheral edge of the seal lip 22a undergoes elastic deformation to be expanded outward. In this state, when the machining unit U is moved forward in the Z-axis direction by a Z-axis drive mechanism (not shown), the machining head 15 of the machining unit U is moved to a machining position within the machining room R2 as shown in FIG. 2 and the work W is subjected to drilling by the plurality of drills 16.

Figure 2:
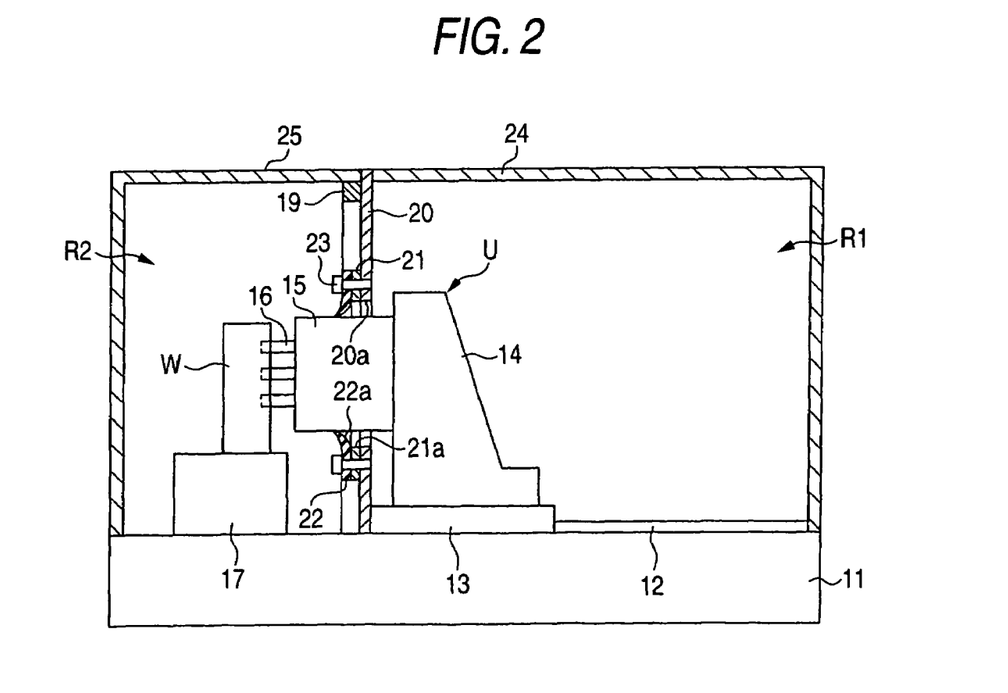
FIG. 2 is a longitudinal, cross sectional view showing machining of a work in the machine tool.

When machining of the work is completed, the machining unit U is moved to a withdrawal position shown by solid lines in FIG. 1 from the machining position shown in FIG. 2 within the machining room R2. In addition, in the case where the drills 16 have worn and exchange thereof is necessary, or exchange of the machining head 15 is needed due to modification in machining, the machining unit U is moved to a tool exchange position shown by two-dot chain lines in FIG. 1 within the machine room R1 from the withdrawal position shown by solid lines in FIG. 1 within the machining room R2, and exchange of the drills 16 or exchange of the machining head 15 is effected.

According to the embodiment, the following features are provided.

(1) In the embodiment, the scraper 22 is mounted corresponding to the opening window 20a of the compartment cover 20, the machining head 15 mounted on the column 14 is caused to enter into the scraper 22 from the opening window 20a, and the seal lip 22a of the scraper 22 seals an entire outer peripheral surface of a body of the machining head 15. Therefore, it is possible to surely prevent a liquid or mist coolant used in machining of the work W from entering into the machine room R1 from the opening window 20a. Accordingly, it is possible to protect parts such as various sensors, limit switches, or the like mounted on the machining unit U, or sliding portions of the Z-axis drive mechanism.

(2) In the embodiment, since the entire outer peripheral surface of the body of the machining head 15 is constantly put into sliding contact with the seal lip 22a of the scraper 22, coolant or chip adhering to the outer peripheral surface of the machining head is scraped toward a tip end side of the outer peripheral surface of the body of the machining head 15 to be removed when the machining work is terminated and the machining head 15 is retreated. Therefore, coolant or chip is not taken into the machine room R1 by advancing or retreating movements.

(3) In the embodiment, when the machining head 15 is moved to the tool exchange position within the machine room R1 from within the machining room R2, the machining head 15 is separated from the seal lip 22a of the scraper 22. At this time, coolant or chip adhering to the outer peripheral surface of the machining head 15 is removed by the seal lip 22a to be moved into the machine room R1 while being in a cleaned state. Therefore, coolant or chip is not taken into the machine room R1.

(4) In the embodiment, since the protective cover 24 for shielding the machining unit U and the protective cover 25 for shielding the work support table 17 are provided on the bed 11 to compartment and form the machine room R1 and the machining room R2, it is possible to prevent coolant and chip from being scattered outside the machine tool in the machining of a work.

(5) In the embodiment, the pair of right and left Z-axis guide rails 12 are laid immediately on the upper surface of the bed 11, and the Z-axis guide rails 12 mount thereon the Z-axis saddle 13 reciprocatively in the Z-axis direction. Therefore, a construction, in which the machining unit U is assembled to the bed 11, is made simple to enhance an assembling accuracy to enhance an accuracy, with which the drills 16 machine a work.

(6) In the embodiment, since the seal frame can be detached from the compartment cover 20 by loosening the bolts 23, it is possible to readily exchange the seal frame.

Subsequently, a modification of the first embodiment is described.

Figure 4:
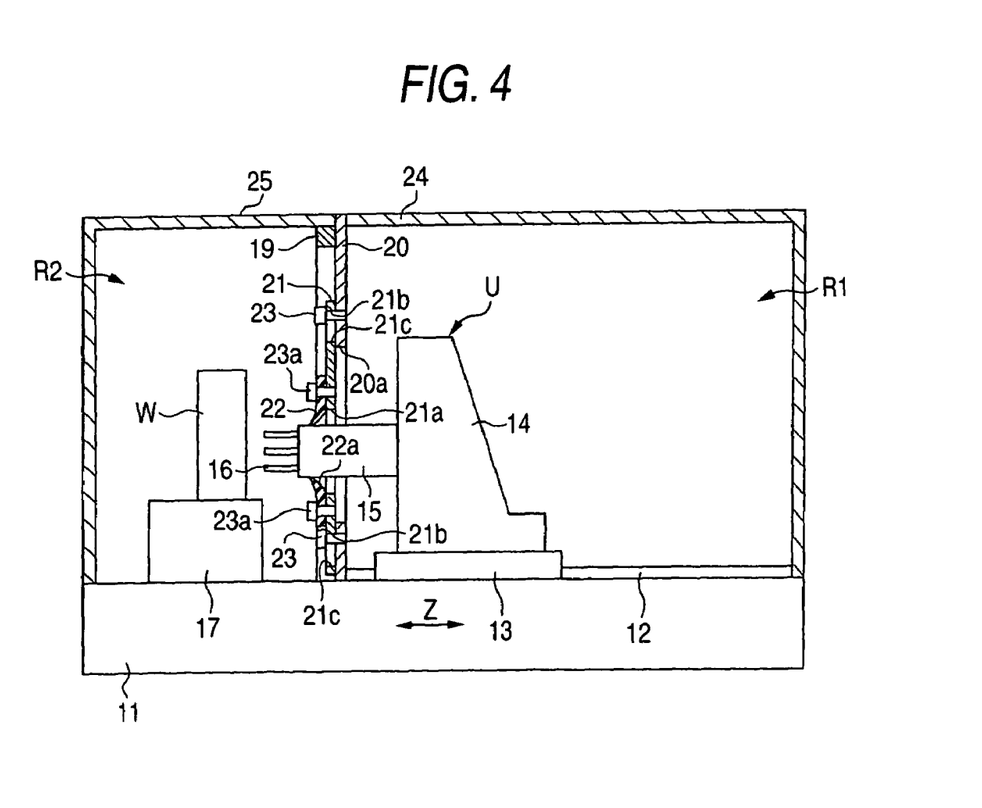
FIG. 4 is a longitudinal, cross sectional view showing a machine tool modified in the first embodiment.
Figure 5:
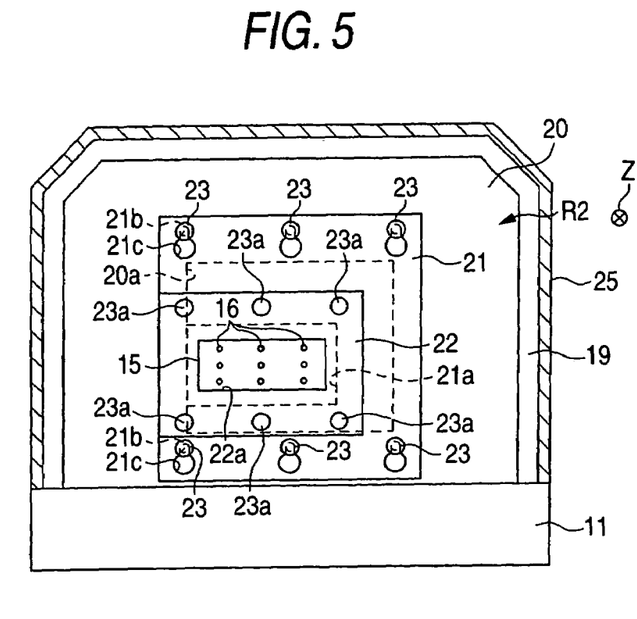
FIG. 5 is a transverse, cross sectional view showing the modification of FIG. 4.

In a modification shown in FIGS. 4 and 5, the machining unit U enables exchange of a plural kinds of machining heads 15 having different body sizes. Also, an opening window 20a is formed in the compartment cover 20 to serve as an opening, through which a machining head 15 having a maximum size can go in and out. Plural kinds of seal frames constituted by forming in a mount frame 21 an opening window 21a, which is sized to correspond to a body size of each of machining heads 15, and clamping a scraper 22 to the mount frame 21 with an adhesive and bolts 23a to make the same integral therewith to project inside the opening window 21a can be selectively and exchangeably mounted on the opening window 20a.

As shown in FIG. 5, holes formed in the mount frame 21 for insertion of the bolts 23 comprise slots 21b positioned upward and directed vertically, and round holes 21c positioned downward and communicated to the slots 21b. Thus the round holes 21c are caused to correspond to heads of the bolts 23 in a state, in which the bolts 23 are loosened, and in this state, the mount frame 21 is permitted to be removed from the compartment cover 20 while the bolts 23 are left.

In addition, since a reference position of the machining head 15 is set by a jig (not shown), which positions an underside of the machining head 15, and a jig, which positions a left side of the machining head 15, the opening window 21a of the mount frame 21 is also formed to have a shape, an underside and a left side of which serve as reference positions in accordance with mount positions of the respective machining head 15, and which are varied in size.

In the modification shown in FIGS. 4 and 5, since mounting is effected so as to enable exchanging plural kinds of seal frames, the case where a body size of the machining head 15 of the machining unit U is modified can be readily met.

In a modification shown in FIG. 6, the machining unit U enables exchanging any one of plural kinds of machining heads 15 having different body sizes, and the opening window 20a conformed to a maximum body size of the machining heads 15 is formed in the compartment cover 20. Also, plural kinds of head covers 26 formed into complementary shapes so as to assume the same shape as the external shape of a body of the machining head 15 having the maximum body size upon mounting on those machining heads 15 having sizes, which are equal to or less in size than the maximum body size, are selectively and exchangeably mounted on the machining head 15. A seal member 27 is mounted on an opening edge of an inner periphery of the head cover 26 to be generally put into contact with the outer peripheral surface of the machining head 15.

Figure 7:
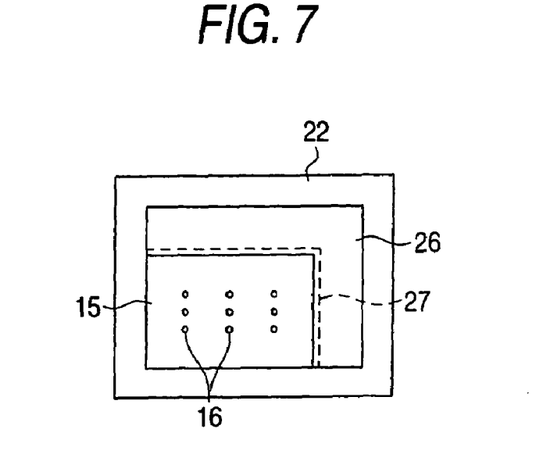
FIG. 7 is a front view showing a machining head and a seal frame in FIG. 3.

The head cover 26 is formed, as shown in FIG. 7, into an elbow shape as viewed in an axial direction of the machining head 15 in terms of setting of a reference position of the machining head 15. Mounting of the head cover 26 on the machining head 15 is effected on, for example, a front surface of the column 14, or the outer peripheral surface of the machining head 15 by a connection member (not shown).

In the above modification, different kinds of machining heads 15 can be readily exchanged only by exchange of the head cover 26 without modifying a seal frame on a side of the opening window 20a of the compartment cover 20.

Second Embodiment

Subsequently, a second embodiment of the invention is described with reference to FIGS. 8 to 10. In addition, those members in second and third embodiments, which have the same function as that in the first embodiment, are denoted by the same reference characters and an explanation thereof is omitted.

Figure 8:
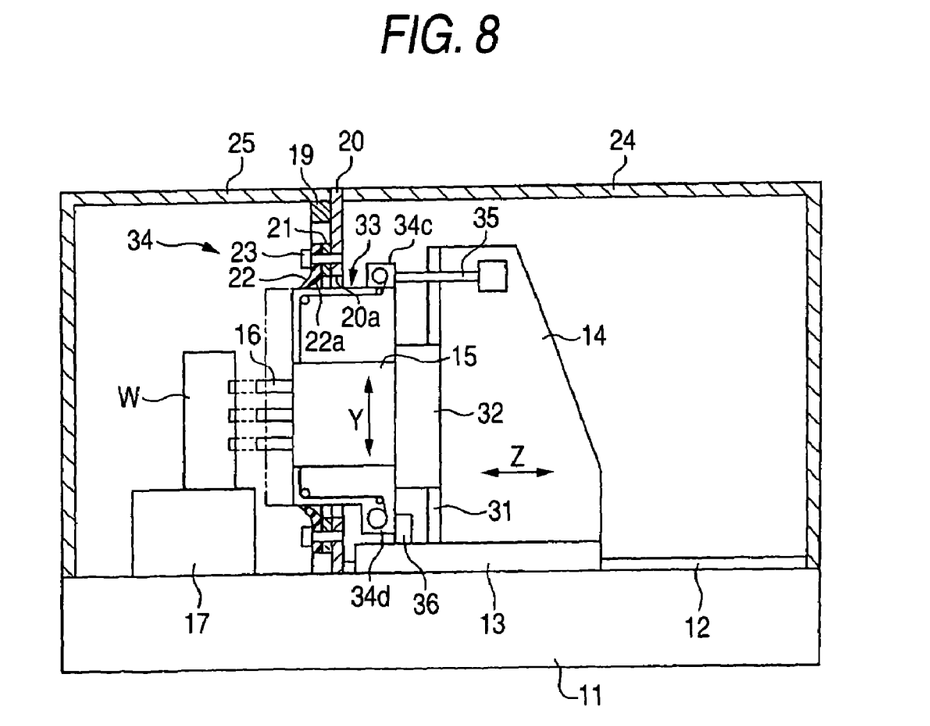
FIG. 8 is a longitudinal, cross sectional view showing a machine tool according to a second embodiment of the invention.

In the second embodiment, as shown in FIG. 8, Y-axis guide rails 31 directed in a Y-axis direction (vertical) is provided on the front surface of the column 14, and a Y-axis saddle 32 is mounted on the Y-axis guide rails 31 such that it can be reciprocated vertically by a Y-axis drive mechanism (not shown) including a servomotor. The machining head 15 is mounted on a front surface of the Y-axis saddle 32. A roll cover mechanism 33 is mounted on the Z-axis saddle 13 and the column 14 to serve as a shield cover to allow up-and-down movements of the machining head 15 and to protect the outer peripheral surface of the body of the machining head 15, the Y-axis guide rails 31, and the Y-axis saddle 32.

Figure 9:
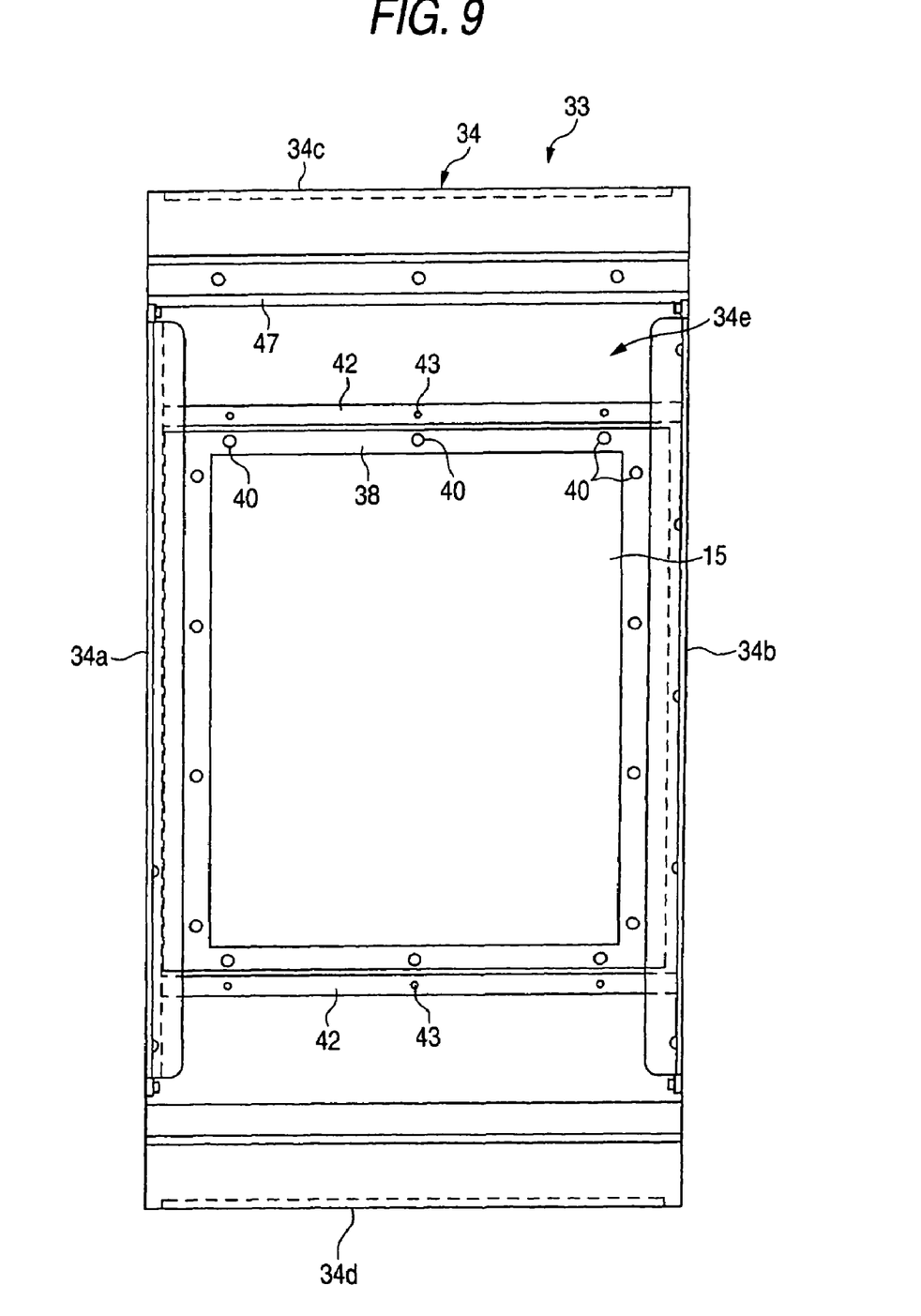
FIG. 9 is an enlarged, front view showing a roll cover mechanism in the second embodiment.
Figure 10:
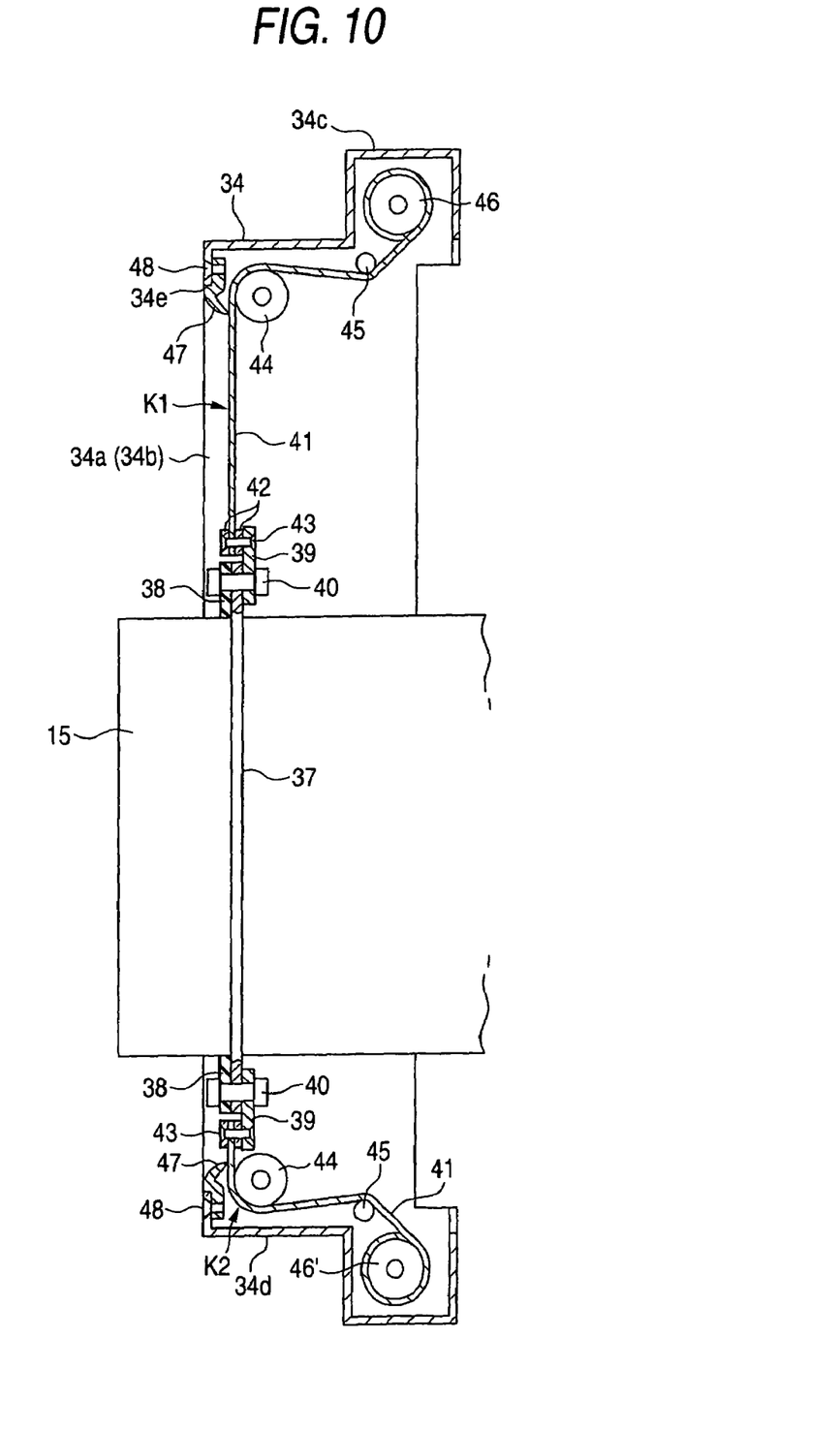
FIG. 10 is an enlarged longitudinal, cross sectional view showing a roll cover mechanism in the second embodiment.

FIG. 9 shows a front surface of the roll cover mechanism 33, and FIG. 8 is a longitudinal cross sectional view showing a central portion of the roll cover mechanism 33. As shown in FIG. 9, a frame 34 constituting the roll cover mechanism 33 is composed of a pair of left and right side plates 34a, 34b, an upper casing 34c bridged between upper ends of the both side plates 34a, 34b, and a lower casing 34d bridged between lower ends of the both side plates 34a, 34b to have a longitudinal, rectangular shape, and an opening window 34e is formed inside the frame. The upper casing 34c is connected to left and right sides of the column 14 by means of a pair of left and right connection rods 35 as shown in FIG. 8. The lower casing 34d is connected to the Z-axis saddle 13 by means of a bracket 36.

The machining head 15 is inserted, as shown in FIG. 8, through the opening window 34e formed in the frame 34 to be able to go up and down within the opening window, and a space defined between an upper surface of the body of the machining head 15 and the upper casing 34c is shielded by an upper roll cover K1. Also, a space defined between a lower surface of the body of the machining head 15 and the lower casing 34d is shielded by a lower roll cover K2. Since the upper and lower roll cover K1, K2 are formed to be vertically symmetrical, only the upper roll cover K1 is described.

A connection frame 37, a front surface of which forms a longitudinal, rectangular shape, is mounted on a prismatic-shaped outer peripheral surface of the body of the machining head 15, and a rubber seal plate 38 for sealing a gap between the machining head 15 and the connection frame 37 is joined to the front surface of the connection frame 37. Horizontally extending band-shaped mount plates 39 are connected to a back surface side of the connection frame 37 by means of bolts 40. A lower end edge of a cover sheet 41 is connected to the mount plate 39 by means of a clamp plate 42 and rivets 43. An upper end edge of the cover sheet 41 is connected to an upper winding shaft 46 via guide rollers 44, 45 provided between the pair of side plates 34a, 34b. For example, a spiral spring (not shown) is received in the upper winding shaft 46 to constantly wind up the cover sheet 41. A scraper 47 is mounted to the opening window 34e of the frame 34 by screws 48 to come into sliding contact with a surface of the cover sheet 41.

Subsequently, an action of the machine tool according to the second embodiment is described.

FIG. 8 shows a state, in which the machining unit U and the roll cover mechanism 33 are disposed in a withdrawal position within the machining room R2. In this state, when the Y-axis saddle 32 is moved upward by a Y-axis drive mechanism (not shown), the machining head 15 is moved upward. In keeping with such action, the cover sheet 41 on a side of the upper roll cover K1 is wound up by the upper winding shaft 46, and the cover sheet 41 on a side of the lower roll cover K2 is wound off from a lower winding shaft 46'. In this manner, the machining head 15 is held at a desired level. In this state, when the machining unit U is advanced in the Z-axis direction from the withdrawal position within the machining room R2 by the Z-axis drive mechanism (not shown), a tip end of the frame 34 is moved to a machining work position as shown by two-dot chain lines in FIG. 8 and the drills 16 machine a work.

In the second embodiment, the machining head 15 is mounted to be enabled by the Y-axis drive mechanism to to go up and down, and the roll cover mechanism 33 is mounted on the Z-axis saddle 13 and the column 14 to allow up-and-down movements of the machining head 15. And an outer peripheral surface of the frame 34 is put into sliding contact with an inner peripheral surface of the seal lip 22a. Therefore, it is possible to prevent coolant and chip from entering the machine room R1 in the machining of a work.

In the embodiment, a telescopic cover mechanism may be used in place of the roll cover mechanism 33.

Third Embodiment

Subsequently, a third embodiment of the invention is described with reference to FIGS. 11 and 12.

Figure 11:
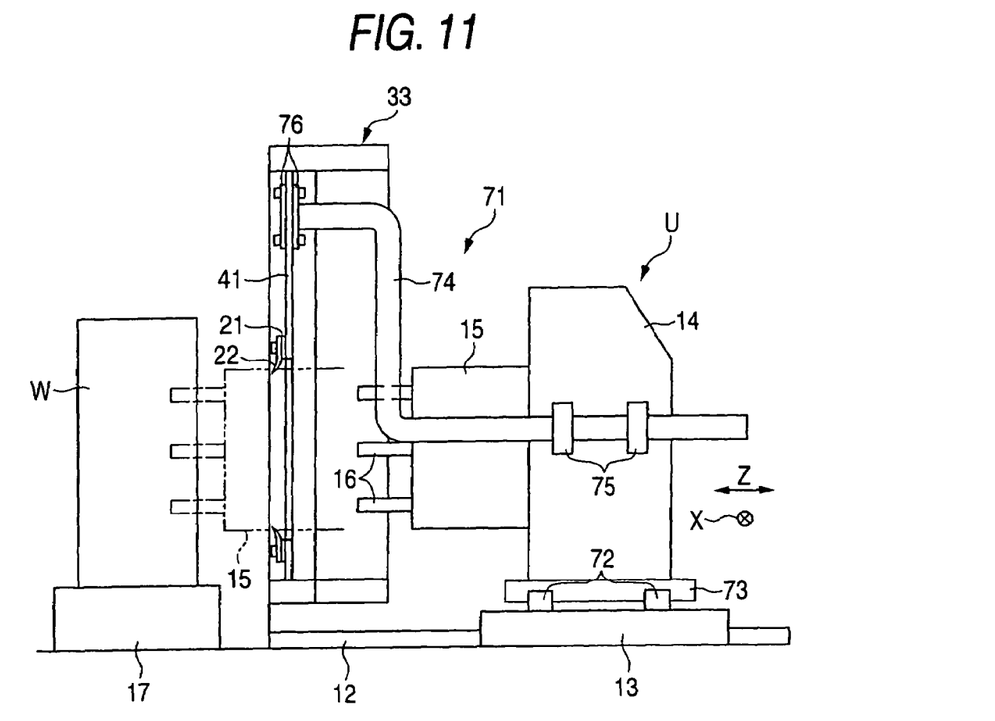
FIG. 11 is a side view showing a machine tool according to a third embodiment of the invention.
Figure 12:
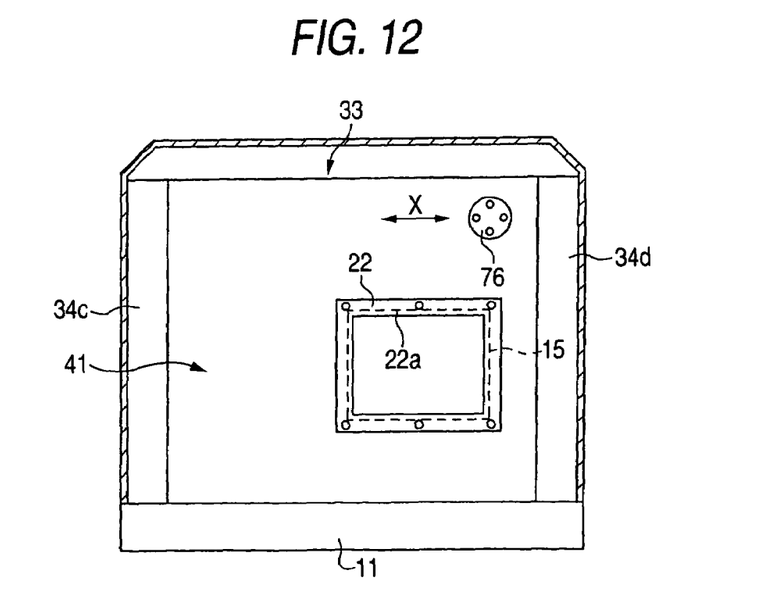
FIG. 12 is a front, cross sectional view showing a cover device according to a third embodiment.

In the third embodiment, a X-axis saddle 73 is mounted on X-axis guide rails 72, which are laid on the upper surface of the Z-axis saddle 13 as shown in FIG. 11 to be in parallel to each other in a X-axis direction (direction perpendicular to a plane of the drawing), such that it can be reciprocated in the X-axis direction, and the column 14 is mounted on an upper surface of the X-axis saddle 73. Also, a roll cover mechanism 33 provided with the same cover sheet 41 as that of the roll cover mechanism 33 is laterally mounted on the support frame 19. Guide members 75 are mounted longitudinally in two locations on the sides of the column 14 to guide a base end portion of a guide bar 74 in the Z-axis direction. A front end portion of the guide bar 74 is bent upward into a L-shape, and a tip end of the front end portion is connected through connection plates 76 to a corner portion (see FIG. 12) of the cover sheet 41 of the roll cover mechanism 33. The guide bar 74 is supported by the guide members 75 to be non-rotatable about the Z-axis and slidable in the Z-axis direction.

In the third embodiment, the guide bar 74, the guide members 75, the connection plates 76, and so on constitute interlocking unit for interlocking the machining unit U and the cover sheet 41 together in the X-axis direction to have the machining head 15 and the scraper 22 following the same correspondingly in the Z-axis direction.

An action of the machine tool according to the third embodiment is described.

Solid lines in FIG. 11 indicate a state, in which the machining unit U is stopped in the tool exchange position within the machine room R1 and the drills 16 are separated from the scraper 22. In this state, when the X-axis saddle 73 is moved along the X-axis guide rails 72 in the X-axis direction by a X-axis drive mechanism (not shown), the guide bar 74 is moved in the direction. Thereby, the cover sheet 41 and the scraper 22 are moved in the direction and the opening window 34e of the scraper 22 is held to correspond to the machining head 15 in the X-axis direction.

When the Z-axis drive mechanism moves the machining unit U forward in the Z-axis direction after a position of the machining head 15 is adjustably moved in the X-axis direction, the tip end of the body of the machining head 15 enters an inner peripheral surface of the seal lip 22a of the scraper 22 as shown by two-dot chain lines in FIG. 11 to be put in a sealed state. In this state, the drills 16 machine a work.

Also, in the third embodiment, a withdrawal position within the machining room R2 corresponds to a state, in which the outer peripheral surface of the body of the machining head 15 contacts with the scraper 22.

In the third embodiment, even when the guide bar 74 and the guide members 75 positionally adjust the machining head 15 in the X-axis direction, the machining head 15 and the scraper 22 on a side of the roll cover mechanism 33 can be held on the same axis with respect to the Z-axis direction.

In addition, the embodiments may be modified in the following manner.

The first embodiment may be configured such that slots (not shown) permitting insertion of the bolts 23 are provided in the compartment cover 20, nuts thread on the bolts 23, and the nuts are loosened to move the bolts 23 in the slots to be able to adjust a mount position of the seal frame.

The second embodiment may be configured such that although not shown, the machining head 15 is mounted through the X-axis saddle on the Y-axis saddle 32 and the roll cover mechanism 33 or the telescopic cover mechanism 51 can extend and contract independently in the X-axis direction and the Y-axis direction.

While the protective cover 24 and the protective cover 25 are arranged in the embodiments, they may be omitted.

What is claimed is:

1. A machine tool comprising:
   a support table provided on an upper surface of a bed to support a work;
   a Z-axis saddle for reciprocation in a longitudinal Z-axis direction;
   a machining unit mounted on the Z-axis saddle and provided with a machining head for machining of the work;
   a compartment cover arranged on the bed to compartment a machining region, in which the work supported on the support table is machined, and a machine region, in which the machining unit is movably arranged;
   an opening window provided on the compartment cover to permit the machining head to go in and out of the machining region therethrough; and
   a seal member in the form of a closed ring to be mounted on an inner peripheral edge of the opening window of the compartment cover;
   wherein an entire periphery of an outer peripheral surface of the machining head is brought into sliding contact with an inner peripheral edge of the seal member in a state, in which the machining head is moved into the machining region from a tool exchange position within the machine region.

2. A machine tool according to claim 1, wherein the machining unit is configured to permit exchange of plural kinds of machining heads having different body sizes, the opening window is formed in the compartment cover to enable a machining head of a maximum size of the plural kinds of machining heads to go in and out of the opening window, and the opening window of the compartment cover selectively and exchangeably mounts thereto plural kinds of seal frames each comprising a mount frame formed with an opening window conformed to a body size of a corresponding one of each of the machining heads, and the seal member mounted to an inner peripheral edge of a respective one of the opening windows of the mount frames and put into contact with an outer peripheral surface of a body of the respective machining head.

3. A machine tool according to claim 2, wherein guide rails are mounted immediately on the upper surface of the bed and the Z-axis saddle of the machining unit is mounted on the guide rails.

4. A machine tool according to claim 3, wherein the seal member comprises a scraper having a seal lip and has a tip end thereof directed toward the machining region.

5. A machine tool according to claim 1, wherein the machining unit is configured to permit exchange of plural kinds of machining heads having different body sizes, the seal member is conformed to a maximum body size of the machining heads and is mounted to the opening window, plural kinds of head covers formed into complementary shapes so as to assume the same shape as the external shape of a body of the machining head having the maximum body size upon mounting on those machining heads having sizes, which are equal to or less in size than the maximum body size, are selectively and exchangeably mounted on the machining unit when the machining heads having sizes which are equal to or less in size than the maximum body size are provided to the machining unit, and a seal member is mounted on an inner edge of each head cover to come into contact with the outer peripheral surface of the respective machining head.

6. A machine tool according to claim 5, wherein guide rails are mounted immediately on the upper surface of the bed and the Z-axis saddle of the machining unit is mounted on the guide rails.

7. A machine tool according to claim 1, wherein the machining head is mounted to be able to reciprocate in a lateral X-axis direction or a vertical Y-axis direction, a shield cover is mounted on the machining unit to shield the machining head and to allow reciprocatory movements of the machining head in the X-axis direction or the Y-axis direction, and an outer peripheral surface of an annular frame constituting the shield cover is brought into sliding contact with an inner peripheral surface of the seal member on a side of the opening window in a state, in which the machining head is moved into the machining region from a tool exchange position within the machine region.

8. A machine tool according to claim 7, wherein the compartment cover comprises a roll cover.

9. A machine tool according to claim 1, wherein the compartment cover comprises an arch-shaped support frame provided upright in a predetermined position on the bed, and an extensible cover mounted inside the support frame to be able to reciprocate together with the seal member in a lateral X-axis direction or a vertical Y-axis direction, and wherein interlocking unit is provided between the machining unit and the extensible cover to move the extensible cover and the seal member in the X-axis direction or the Y-axis direction so that the machining head corresponds to the seal member as viewed in a Z-axis direction when the machining unit is moved in the X-axis direction or the Y-axis direction.

10. A machine tool according to claim 9, wherein the compartment cover comprises a roll cover.

11. A machine tool according to claim 1, wherein guide rails are mounted immediately on the upper surface of the bed and the Z-axis saddle of the machining unit is mounted on the guide rails.

12. A machine tool according to claim 11, wherein the seal member comprises a scraper having a seal lip and has a tip end thereof directed toward the machining region.

13. A machine tool according to claim 1, wherein the seal member comprises a scraper having a seal lip and has a tip end thereof directed toward the machining region.

14. A machine tool according to claim 13, wherein the machining head comprises a multi spindle head provided with a plurality of tools.

15. A machine tool according to claim 1, wherein the machining head comprises a multi spindle head provided with a plurality of tools.

* * * * *